S. B. GRAY, DEC'D.
B. S. GRAY, EXECUTOR.
MOTOR VEHICLE.
APPLICATION FILED FEB. 24, 1908.
923,789.
Patented June 1, 1909.
5 SHEETS—SHEET 3.
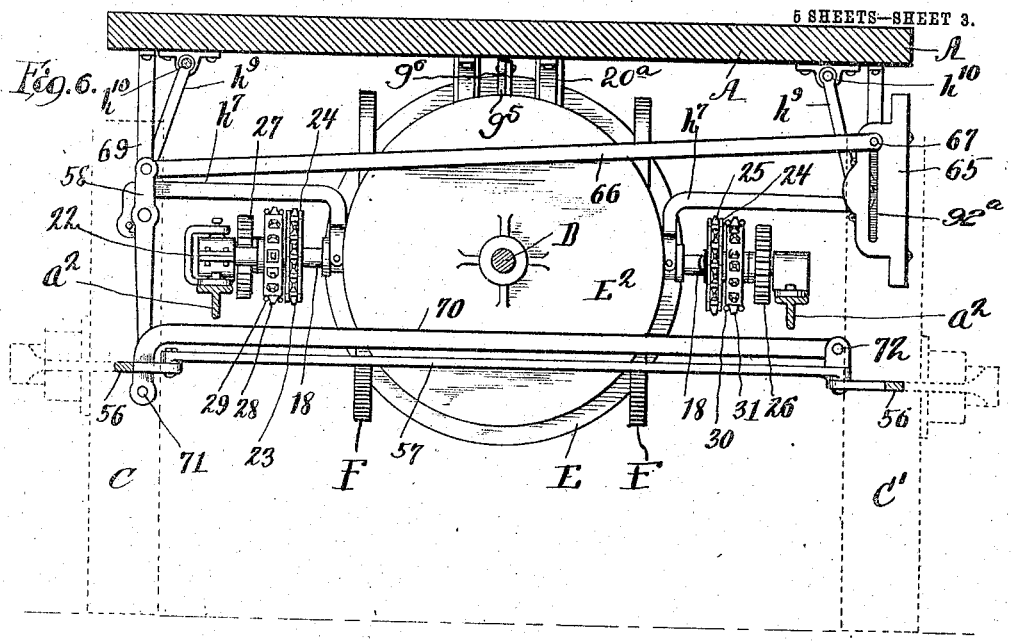
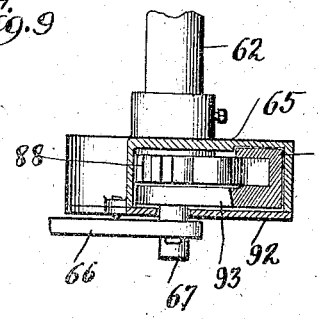
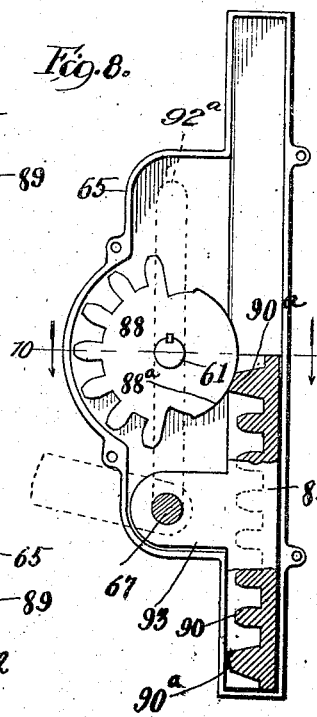
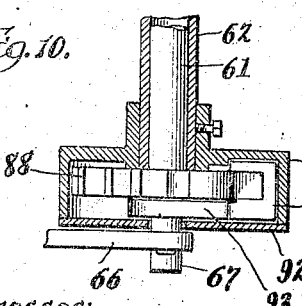
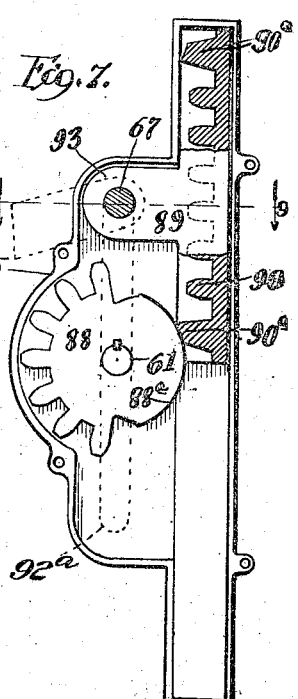
Witnesses:
Inventor

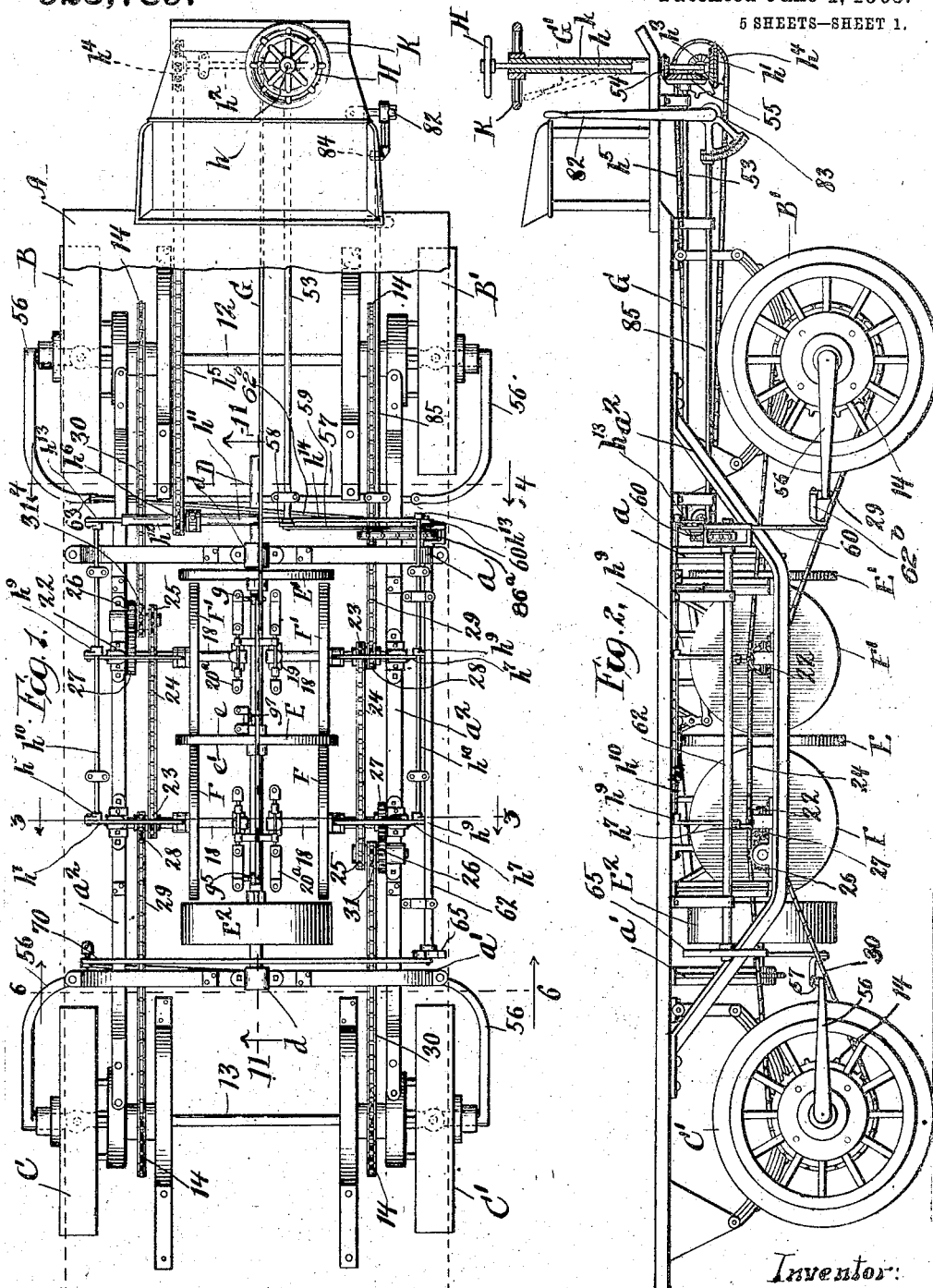

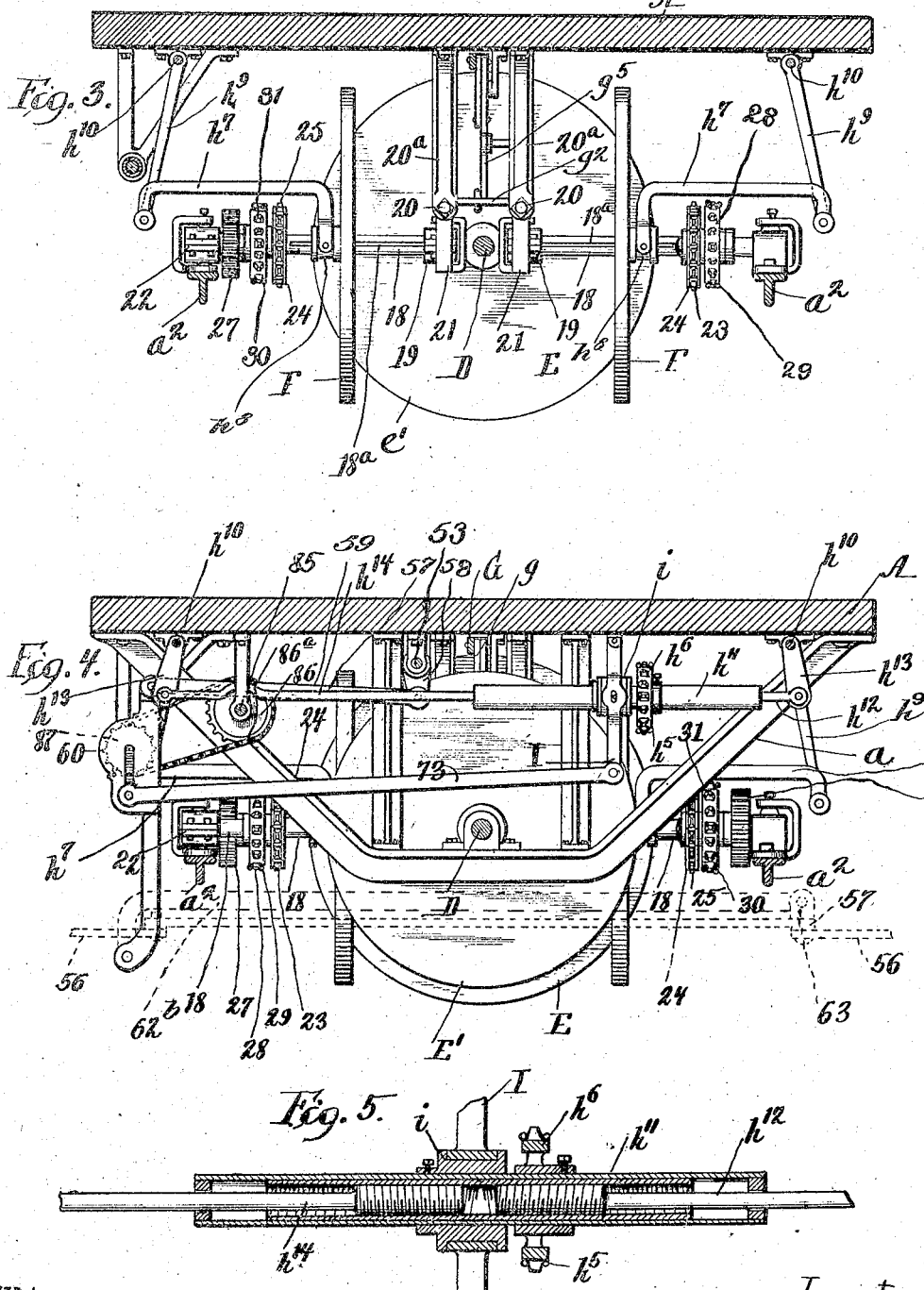

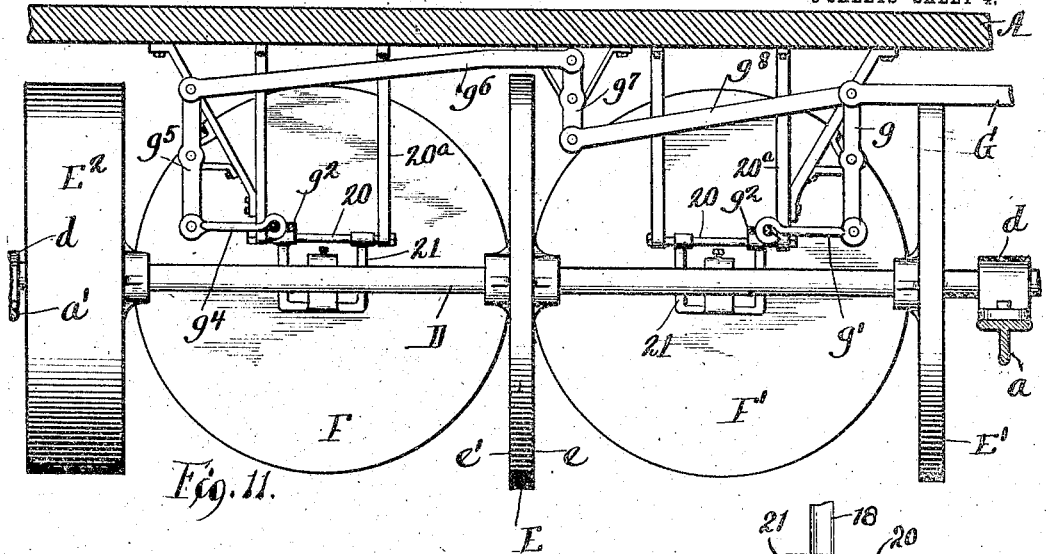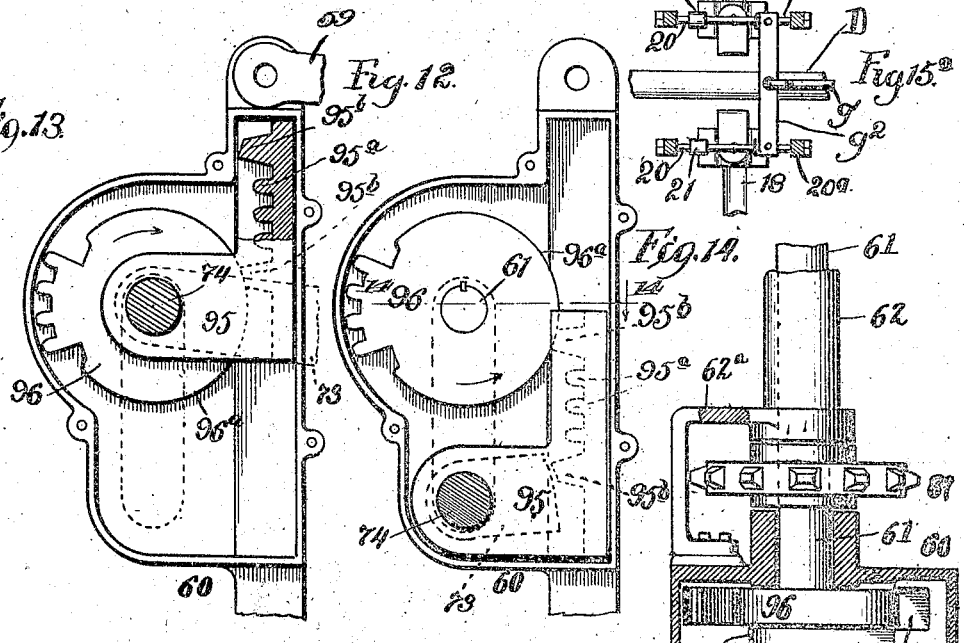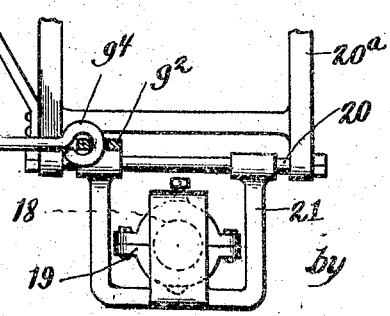

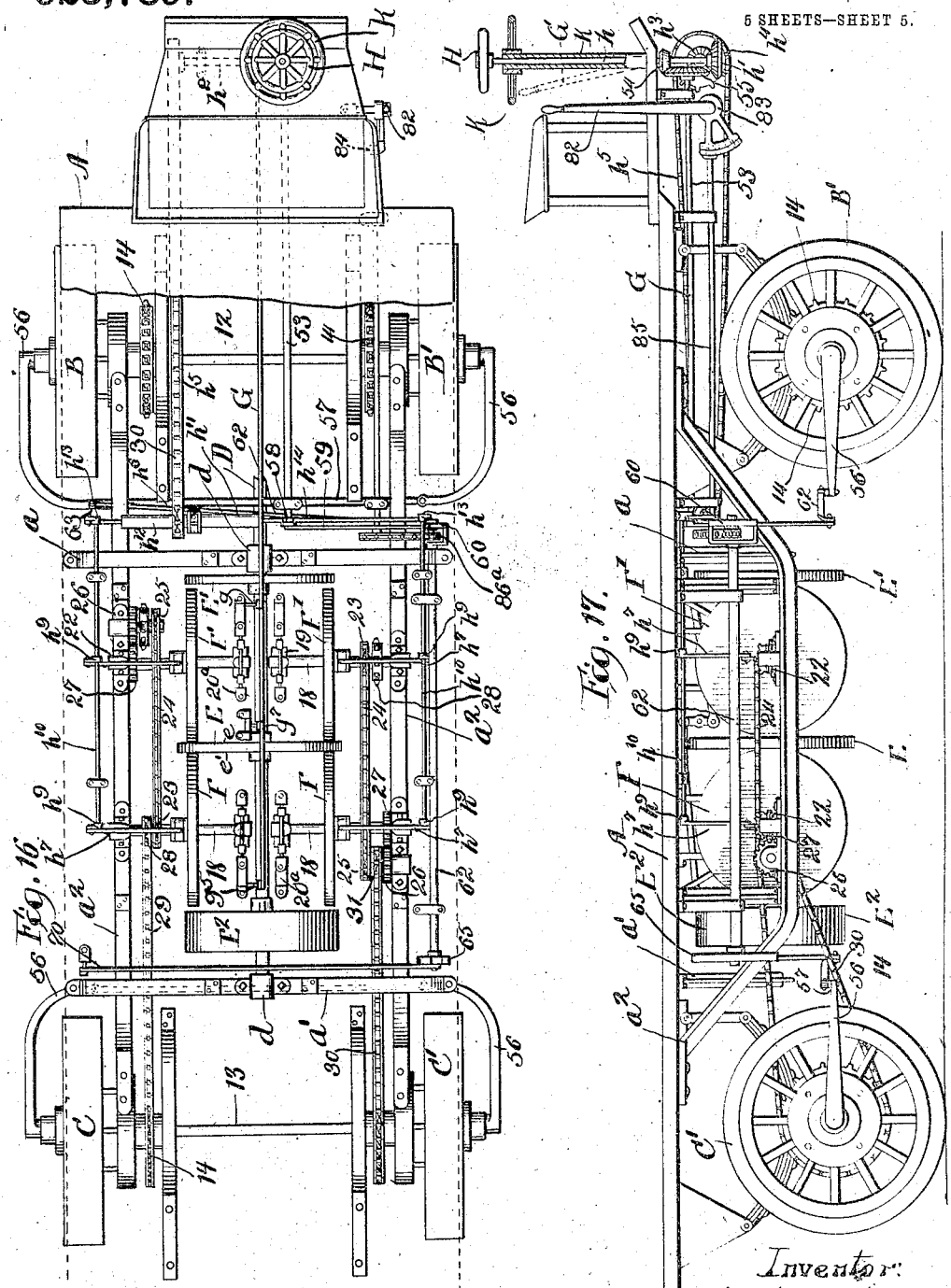

UNITED STATES PATENT OFFICE.

STEPHEN B. GRAY, OF JACKSONVILLE, ILLINOIS; BARTLETT S. GRAY EXECUTOR OF SAID STEPHEN B. GRAY, DECEASED.

MOTOR-VEHICLE.

No. 923,789.  Specification of Letters Patent.  Patented June 1, 1909.

Application filed February 24, 1908. Serial No. 417,271.

*To all whom it may concern:*

Be it known that I, STEPHEN B. GRAY, a resident of Jacksonville, in the county of Morgan and State of Illinois, have invented certain new and useful Improvements in Motor-Vehicles, of which the following is a full, clear, and exact description.

The present invention relates to motor-vehicles, and more particularly to the mechanism for driving and steering the traction-wheels thereof.

The invention designs to provide an improved friction drive-mechanism for a motor-vehicle in which there is a plurality of frictionally driven wheels for each of the driving-connections.

The invention further designs to provide an improved friction drive-mechanism for a vehicle in which all of the wheels are driven, and in which both the rear and front wheels may be turned in opposite directions respectively, or all of the wheels may be turned in the same direction, the driving-mechanism being adapted to operate the traction-wheels at traction-maintaining speed according to the different steering-operations.

The invention still further designs to provide an improved drive-mechanism and steering-mechanism for motor-vehicles.

The invention consists in the several novel features hereinafter set forth and more particularly defined by claim at the conclusion hereof.

In the drawings: Figure 1 is a plan of a motor-vehicle embodying the invention, the vehicle-body being removed or broken away. Fig. 2 is a side elevation. Fig. 3 is a transverse section on line 3—3 of Fig. 1. Fig. 4 is a similar view taken on line 4—4 of Fig. 1. Fig. 5 is a detail section of parts of the adjusting-mechanism for the driven friction-wheels. Fig. 6 is a transverse section on line 6—6 of Fig. 1. Figs. 7 and 8 are details of the reversing-device for one of the steering-connections, illustrating the device in its alternative positions respectively. Fig. 9 is a section on line 9—9 of Fig. 7. Fig. 10 is a section on line 10—10 of Fig. 8. Fig. 11 is a longitudinal section on line 11—11 of Fig. 1. Figs. 12 and 13 are details of the device for rendering inoperative the mechanism for differentially adjusting the driven friction-wheels, to vary the relative speed of the driving-connections. Fig. 14 is a section on line 14—14 of Fig. 12. Fig. 15 is a detail view of one of the hangers for pivotally sustaining the inner ends of the driven friction wheel-shafts. Fig. 15$^a$ is a plan of the bearings for the inner ends of the driven friction-wheel-shafts the supports being shown in section. Fig. 16 is a plan of a vehicle having the driving-connections for the front-wheels omitted; and Fig. 17 is a side elevation of the same.

The vehicle usually comprises a suitable frame or body A which is suitably connected to and supported by a front axle 12 and a rear axle 13. A pair of front wheels B and B' are dirigibly mounted or pivotally connected to the front axle and a pair of wheels C and C' are similarly connected to the rear axle. Each of the wheel mounts is provided with a sprocket wheel 14 whereby it may be driven by the driving-connections hereinafter set forth. The frame comprises inverted arch-bars or frames $a$ and $a'$ secured to the body and truss-bars $a^2$ also secured to the frame.

A longitudinally extending main drive-shaft D is journaled in bearings $d$ mounted on the frame bars $a$ and $a'$ and is usually driven by a motor (not shown). A main drive-wheel or disk E is secured to the main drive-shaft and is provided with oppositely disposed friction drive-surfaces $e$ and $e'$ which are employed for operating the driving-connections so the vehicle will be propelled forwardly. A pair of friction drive-disks E' and E$^2$ are also secured to the main drive-shaft and are provided with oppositely disposed or facing friction-surfaces for operating the driving-connections in reverse direction. Disk-wheel E$^2$ may also serve as a fly-wheel for the main or engine-shaft D, or to drive a belt.

A driving-connection is provided for one or more of the traction-wheels at each side of the vehicle. Each of said driving-connections comprises a pair of friction-wheels F, F' arranged to engage the oppositely-disposed friction-drive surfaces $e$, $e'$ of the driving-wheel or disk E respectively. Each of the friction-wheels F, F' is slidably mounted and connected to rotate with a transversely extending shaft 18 which has its inner end journaled in a swiveled box 19 (Fig. 15) held in a hanger 21 which is slidably mounted on a rod 20 secured in a bracket 20$^a$ depending from the frame A. The outer end of each of the shafts 18 is journaled in a swiveled box 22 suitably sustained by one of the frame bars $a^2$. The purpose of mounting these shafts in swiveled boxes is to permit the inner ends thereof to be shifted to cause the friction wheels carried thereby to be shifted into and out of engagement with the friction-surfaces whereby they are driven. Each of the driven shafts 18 is connected to drive both of the traction-wheels at one side of the vehicle.

A pair of friction-wheels F, F', each of which is driven by the oppositely disposed friction faces of wheel E, is employed for the connections at each side of the vehicle respectively. The purpose of this construction is to provide a plurality of wheels for driving each connection so that there will be less likelihood of slippage in driving the connections. The shafts 18 of each pair of pulleys F, F' are respectively connected to conjointly operate the connections for the traction-wheels, by a sprocket wheel 23 on one of the shafts, a chain 24 connecting said sprocket with a sprocket-wheel 25, which is mounted to be operated by a gear-wheel 26 which meshes with a gear-wheel 27 on the other of the shafts 18. The gears 26 and 27 are interposed in the connection so that both friction-wheels F and F' will operate the several members of the connection in the same direction.

A sprocket-wheel 28, secured to the shaft 18 of friction-wheel F at one side of the vehicle, drives a chain 29 for driving the sprocket-wheel 14, which is operatively connected to the traction-wheel C. A chain 30 operatively connects a sprocket-wheel 31, which is secured to revolve with pinion 26 and sprocket-wheel 25, and the sprocket-wheel 14 which is connected to the front traction-wheel B. Similar driving-connections are provided at the other side of the vehicle for driving the traction-wheels C' and B'.

The shafts 18 for the friction-wheels F, F', respectively, are conjointly shiftable into and out of engagement with the driving-faces $e$, $e'$ of the drive-wheel E by controlling-mechanism (Figs. 1 and 11) comprising a rod G, which is connected at its front end to a suitable lever G' (shown in dotted lines) adapted to be locked in assigned position. Rod G is connected to shift the front pair of shafts 18 by a lever $g$ which has its upper end pivoted to said rod, and its lower end pivotally connected to a link $g'$. A link $g^2$ is pivotally connected to the hangers 21 in which the swiveled bearings 19 are mounted, and link $g'$ is pivotally connected to the link $g^2$ medially so that when lever $g$ is operated the bearings for both of said shafts will be shifted to cause the friction-wheels mounted thereon to be correspondingly shifted. By means of this jointed connection the pressure of the friction-pulleys against their driving-faces will be equalized. The shaft 18 of each of the rear pair of friction-wheels F is similarly connected by means of a link $g^2$ and is also operatively connected to the rod $g$ by a link $g^4$, lever $g^5$, link $g^6$, lever $g^7$, and link $g^8$. This controlling-rod G and the connections aforesaid, provide means for shifting all of the friction-wheels F, F', conjointly and simultaneously into and out of engagement with their respective driving-faces, or by extended shift the friction-wheels F, F' respectively may be shifted into engagement with the disks $E^2$ and $E'$ respectively, to drive all of the connections in reverse direction.

Each of the friction-wheels F and F' is slidably mounted on its shaft 18 by means of a key secured in its hub and mounted to slide in a key-way $18^a$ (Fig. 3) in the shaft so that said wheels may be adjusted radially with respect to the axis of revolution of the main drive-shaft D, to vary the relative speed of said pulleys with respect to the main drive shaft. The mechanism for adjusting the friction-wheels to vary their speed and to correspondingly vary the speed of the driving-connections operated thereby, comprises a wheel H secured to a shaft $h$ extending through the steering-post and having a beveled gear $h'$ secured to its lower end, and a shaft $h^2$ having a pinion $h^3$ meshing with gear $h'$, a sprocket wheel $h^4$ secured to said shaft, a chain $h^5$ connecting said sprocket-wheel, and a sprocket-wheel $h^6$ which adjusts the screw-operated mechanism (Fig. 5) for shifting the friction-wheels F, and F'. Each of the wheels F, F' is adjusted on its shaft 18 by a link $h^7$ (Fig. 3) which is suitably connected to a non-revoluble collar $h^8$ disposed in a groove in the hub of each of said wheels. Each link $h^7$ is pivotally connected to the lower end of an arm $h^9$ which is secured to a rock-shaft $h^{10}$. One of said rock-shafts is disposed at each side of the vehicle and operates the levers $h^7$ for the friction-wheels F and F' at the corresponding side. Said rock-shafts $h^{10}$ are simultaneously and equidistantly operated, to conjointly shift all of the friction-wheels F, F' to or from the axis of revolution of the drive-shaft D, by sprocket-wheel $h^6$ which is secured to a sleeve $h^{11}$ which is provided with internal right and left hand screw-threads for respectively operating the corresponding thread on a rod $h^{12}$ which is connected to an operating-arm $h^{13}$ to the rock-shaft $h^{10}$ at one side of the vehicle, and for operating a rod $h^{14}$ which is connected to an arm $h^{13}$ secured to the rock-shaft $h^{10}$ at the other side of the vehicle. Resultantly, when controller-wheel H is turned it will operate gears $h'$, $h^3$, shaft $h^2$, sprocket-wheel $h^4$, chain $h^5$ and sprocket-wheel $h^6$. Said sprocket-wheel $h^6$ will correspondingly turn sleeve $h^{11}$ and operate the screw-rods $h^{12}$ and $h^{14}$ in opposite directions respectively to conjointly and correspondingly shift rock-shafts $h^{10}$ which will effect shift of arms $h^9$ and levers $h^7$ which are connected to the friction-wheels F, F' respectively. Resultantly, the wheel or lever H controls and serves to simultaneously and conjointly adjust the friction-wheels F, F' to cause said wheels to be driven at different speeds from the main drive-shaft.

Each of the front and rear traction-wheels is pivotally connected to one of the axles so that each is dirigible. Associated with each pivotal wheel mount is a suitable driving connection operated by the sprocket-wheel 14 and which permits the wheel to be driven when it is run straight or turned at an angle with respect to the vehicle body. The specific construction of this wheel mount forms no part of the present invention and an example of this type of mount is illustrated and set forth in an application for Letters Patent filed by me February 13, 1907, Serial No. 357,184, to which reference may be had for the details thereof.

The improved driving-mechanism is of such construction that each of the wheels will be positively driven and embodies mechanism whereby the traction-wheels at one side of the vehicle may be driven at a differential speed with respect to the traction-wheels at the other side when the vehicle is traveling around a turn, so that each of the wheels will be driven at proper traction-maintaining speed, thus avoiding the use of the usual differential or slip gear-mechanism which permits one wheel to travel faster than the other or slippage of the friction-wheels but does not positively drive each of the wheels at such speed that traction of all of the wheels will be maintained at all times.

At times, it is desirable to turn all of the wheels in the same direction to cause the vehicle to move bodily laterally and longitudinally, in lieu of the more usual turning movement in which the rear and front wheels travel in substantially the same curvilinear path. When the former mode of steering is employed all of the wheels should be driven at substantially the same speed. To permit all of the traction-wheels to be turned in the same direction to greater or less degree and cause all of the wheels to be driven at the same speed mechanism is provided which sets the driving-mechanism so that all the wheels will be driven at the same relative speed when desired.

Steering-means is provided which is adapted to swing all of the traction-wheels about their pivotal connection with the frame. A steering-wheel or lever K is suitably mounted to operate a hollow shaft or steering-post $k$ which operates a longitudinally extending shaft 53 by means of a pinion 54 and a gear-wheel 55 meshing therewith (Fig. 2). The swinging or stub-axle of each traction-wheel has secured thereto an arm 56 whereby the wheel can be swung laterally in the desired direction. The arms of the front and rear wheels respectively are cross-connected by a link 57, so that they will be caused to swing in unison and equidistantly by the steering-mechanism. The operating-connection for steering the front wheels by the steering-shaft 53 and operating the cross-connector 57 for the front wheels, comprises an arm 58 (Fig. 4) secured to shaft 53, link 59 (Fig. 4) connected to the upper end of a lever 60 which is pivotally sustained by a shaft 61 (Fig. 12) and secured to a longitudinal sleeve 62 on said shaft, by a bracket $62^a$ (Fig. 14). The lower end of lever 60 is connected by a link $62^b$ to the cross-connector for the front wheels, as at 63. When the steering-wheel is turned the front wheels are operated by said connection and sleeve 62 is oscillated to operate the steering-connection for the rear wheels, which comprises (Figs. 6—7) a lever or frame 65 secured to the rear end of sleeve 62 and a link 66 which is pivotally connected to a stud 67 on a slide which is mounted in lever 65 and locked thereto, and the other end of link 66 is pivotally connected to the upper end of a lever 58, which is pivotally sustained by a hanger 69 and has its lower end connected to the cross-connector 57 for the rear steering-wheels by a link 70 which is pivotally connected to said lever as at 71 and to said cross-connection at 72.

The steering-mechanism, when the steering-connection is in one of its alternative positions, causes the front wheels to be swung conjointly and equidistantly in one direction and the rear wheels to be swung in the opposite direction when the vehicle is to make a turn in the more usual way. When that occurs, the inner wheels traveling over an arc of shorter radius than the outer wheels, are driven at a slightly lower speed in order that they may be positively driven at traction-maintaining speed and according to the distance over which the wheels respectively travel. To effect this differential travel of the traction-wheels according to the angle at which the wheels are turned, the friction-wheels F and F' are conjointly adjusted to cause the driving-connection at one side of the vehicle to be driven at a different relative speed with respect to the driving-connection at the other side of the vehicle. This adjustment is effected by operating the adjusting-connections for the wheels F, F' so that the friction wheels F, F' at one side will be moved from, and the friction-wheels F, and F' at the other side will be moved toward the axis of revolution of the driving-disk; whereby, the driving-connections at each side of the vehicle will be driven at different relative speed when the steering-wheel is operated.

The mechanism for differentially adjusting the friction-wheels comprises (see Fig. 4) a lever I, which is pivotally connected at its upper end to the frame, and a link 73 which is connected at one end to stud 74 on lever 60. Stud 74 is normally locked in the lower end of lever 60. Link 73 is connected to lever I which latter is connected by means of a collar $i$ to the screw-sleeve $h^{11}$ whereby the adjusting-mechanism for the friction-wheels F and F' is operated. When the sleeve is operated by means of lever I, arms $h^{13}$ and rock-shafts $h^{10}$ are operated in the same direction so that in lieu of adjusting the wheels F, F' to maintain the same relation with respect to the main drive-shaft, they will be differentially operated, so that the friction-wheels at one side will be adjusted toward said shaft and those at the other side will be adjusted away from the shaft; thus causing the driving-connections at the sides of the vehicle respectively to be driven at different speeds. Stud 74 being connected to lever 60 of the steering-mechanism will be operated correspondingly to the steering-wheel and correspondingly adjust the friction-wheels to correspondingly drive the traction-wheels at one side of the machine at different speed with respect to those at the other. When the traction-wheels are held to travel straight then the steering-wheel operated connection, which controls the differential adjustment of the friction-wheels F, F' holds the screw sleeve $h^{11}$ in position to cause the friction-wheels to be driven at the same speed to cause all of the traction-wheels to be correspondingly driven. When the steering-device is operated to cause the vehicle to turn in either direction the friction-wheels F, F' will be relatively adjusted to cause the driving-connections for the wheels at the inner side of the turn to be driven at a lower speed than those at the outer side. This variation of relative speed occurs when the stud 74 is locked in operative or eccentric position seen in Fig. 4. Resultantly, when the steering-mechanism is operated, the relative speed of the wheels at one side is correspondingly varied with respect to the speed of the wheels at the other side and according to the direction in which the vehicle is turned, to always cause all of the wheels to be positively driven at traction-maintaining speed.

In practice it is sometimes desirable to turn all of the traction-wheels in the same direction to cause both the front and rear wheels to move laterally in the same direction, so as to cause the vehicle to steer or move bodily to one side or the other. To permit this to be done, the steering-connections for the front and rear wheels are manipulated so that in lieu of being operated in opposite directions relatively, they will be operated to turn all of the traction-wheels in the same direction. When this method of steering is used all of the traction-wheels are positively driven at the same speed. A device is provided to manipulate one of the steering-connections, e. g., the rear, so that the movement thereof will be in reverse direction from that normally given to it by the steering-lever. This reversing-device is controlled by a hand-lever 82 (Fig. 2) pivotally sustained at 83 and provided with a segmental rack for rotating a pinion 84 and a shaft 85 whereto the pinion is secured. To the rear end of said shaft a sprocket-wheel 86 is secured and this sprocket-wheel operates a chain $86^a$ which operates sprocket 87 secured to shaft 61 which extends through and is journaled in sleeve 62 which connects the front and rear steering-connections. To the rear end of shaft 61 is secured (Figs. 7-10) a segmental rack or toothed wheel 88 which is adapted to shift a slide 89 which is mounted in lever 65 and which carries the reversible stud 67. Slide 89 has a series of teeth 90 adapted to be engaged by the teeth of wheel 88 to shift the slide and stud 67 to the opposite side of the lever-fulcrum or sleeve 62, so that the steering-connection (link 66, lever 58, link 57 and arms 56) will operate the rear traction-wheels in the same direction as and correspondingly to the front-wheels when the parts are in position illustrated in Fig. 8.

The end-teeth $90^a$ on slide 89 are formed to respectively engage a concentric surface $88^a$ on wheel 88 when the slide is in either of its alternative operative positions to lock the slide and stud 67 against radial movement, but to permit the slide to swing with sleeve 62. Resultantly, the slide is locked in either of its operative positions without interfering with its reversibility or its oscillation in steering. A plate 92 is secured to the open face of the lever 65, and stud 67 which is secured to an offset lug 93 of slide 89, extends through a slot $92^a$ in said plate. The position of said parts when causing the front and rear wheels to be swung in opposite directions is illustrated in Fig. 7. As a result of this construction, the reversing-device may be manipulated at any time, no matter what the position of steering-wheel or connections may be, from either of its alternative positions.

By means of lever 82 and the reversible connection aforesaid, the steering-wheel may be used in the same manner to control the course of the vehicle, by swinging all of the wheels in the same direction, or by swinging the front and rear wheels in opposite directions respectively.

When the steering-connections are operated to turn all of the traction-wheels in the same direction, the mechanism for differentially adjusting the friction-wheels F and F' at each side respectively, should be adjusted into and held in position to cause the driving-connections at both sides of the vehicle to be driven at the same relative speed. For this purpose, stud 74 is slidably mounted in lever 60 (Figs. 12-14) which is operated by the steering-wheel. When the differential adjusting-mechanism is to be rendered inoperative, stud 74 is shifted into "dead center" relation with respect to lever 60, so that when the latter is oscillated it will not operate link 73, lever I, and sleeve h'' to vary the relative position of the friction wheels F, F' in response to the steering-lever. The mechanism for rendering this connection inoperative by the steering-lever is controlled by shaft 61 which is operated by lever 82 which is employed for reversing one of the steering-connections. Stud 74 is secured to a slide 95 which is provided with a series of rack teeth 95$^a$ and confined in a way formed in lever 60. A toothed wheel 96, secured at the front end of shaft 61, is adapted to shift slide 95 from its operative position (Fig. 12) to its inoperative position (Fig. 13). The end teeth 95$^b$ are adapted to engage concentric surface 96$^a$ on wheel 96 to lock the slide in either of its alternative positions so it will be secured against tangential movement, but free to oscillate with lever 60. This construction makes it possible to render the differential adjusting-mechanism for the friction-wheels inoperative and to lock the same in shifted relation to the lever, and does not at any time interfere with the operation of the steering-mechanism. Hand-lever 82 when it is manipulated to vary the steering-connections for the traction-wheels to change the mode of steering, rotates shaft 61 to adjust stud 74, so the friction-wheels F, F' at the sides of the vehicle respectively will be locked in position to cause all of the traction-wheels to be driven at the same relative speed. The same operation of hand-lever 82, which controls the reversing-device of the steering-connection, thus controls the device for rendering the differential adjusting-mechanism operative and inoperative.

If desired, the improved driving-mechanism may be applied to a vehicle in which only one wheel at each side is driven as shown in Figs. 16 and 17 in which the driving-connection for the front-wheels is omitted. The construction being otherwise the same as that heretofore described.

The operation of the improved mechanism will be as follows: Main drive-shaft D, being driven by the motor, will impart revolution to the drive-wheels E, E' and E$^2$ on which the friction driving-faces are secured. Normally the rod G will be held in position to cause the friction-wheels F, F' to be disengaged from the driving-faces operated by the main shaft. To connect the driving-mechanism to the main shaft, rod G will be operated to simultaneously shift the friction-wheels F, F' into engagement with the friction-faces of driving-wheel E respectively. The driving-connections at each side of the vehicle will then be driven and if the wheels are traveling straight ahead the friction-wheels will be adjusted to operate both of the driving-connections and all of the traction-wheels at the same relative speed. To correspondingly vary the speed of all of the traction-wheels to change the speed of the vehicle, controller wheel H will be operated, which will cause the friction-wheels F, F' to be simultaneously, conjointly and equidistantly adjusted to or from the axis of revolution of the main drive-shaft so the speed of the traction-wheels will be correspondingly varied. When the steering-wheel is manipulated to cause the vehicle to travel to either side the front and rear wheels will be swung in opposite directions respectively by the steering-connections and lever 60 will simultaneously operate stud 74, link 73, and lever I to operate the adjusting-mechanism for said friction-wheels so the driving-connection at one side will be driven at differential speed with respect to the driving-connection and traction-wheels at the other side and so that the speed of one of said connections will be increased and the other decreased correspondingly and so that the wheels B' and C' will travel at greater or less speed with respect to the wheels B, C at the other side according to the direction in and extent to which the traction-wheels are turned. Thus, it will be seen, that if the traction-wheels be turned in either direction their relative speed will be varied so that all of them will be driven at substantially traction-maintaining speed. When it is desired to steer the vehicle by turning all of the traction-wheels in the same direction, lever 82 will be shifted to operate segment 84, pinion 85, (Fig. 2) sprockets 86 and 87, shaft 61, and toothed-wheel 88 to shift or reverse stud 67 of the steering-connection for the rear traction-wheels so the latter will be shifted under control of the steering-wheel K in the same direction as the front wheels. Simultaneously shaft 61 will operate toothed wheel 96 to operate slide 95 to shift stud 74 into dead center relation with respect to lever 60 so that manipulation of the latter by the steering-wheel K will not affect the connections for differentially adjusting the friction-wheels F, F' and so that said stud and the connection controlled thereby, will be locked in position to cause all of the traction-wheels to be driven at the same speed. If said adjusting-mechanism is not in normal position, the operation of lever 82 will cause it to be adjusted into such position. Reverse shift of lever 82 will cause stud 67 for the rear steering-connection and stud 74 for the differential adjusting-connection to be set and locked in proper position for operation of the front and rear traction-wheels in opposite directions by steering-wheels K, and to cause differential adjustment of the pulleys by the steering-wheel.

The invention is not to be understood as restricted to the details illustrated and described since these may be modified by the skilled mechanic without departing from the spirit and scope of the invention.

Having thus described the invention, what I claim as new and desire to secure by Letters Patent, is:

1. In a motor-vehicle, the combination of a pair of rear and a pair of front wheels, a main drive-shaft, a pair of friction-surfaces on and operated by said shaft, and a pair of driving-connections one for a wheel at each side of the vehicle respectively, each of said driving-connections comprising a pair of friction-wheels engaging said friction-surfaces respectively.

2. In a motor-vehicle, the combination of a pair of rear and a pair of front wheels, a main-drive shaft, a pair of friction-surfaces oppositely disposed on and operated by said shaft, and a pair of driving-connections, one for a wheel at each side of the vehicle respectively, each of said driving-connections comprising a pair of friction-wheels engaging said friction-surfaces respectively.

3. In a motor-vehicle, the combination of a pair of rear and a pair of front wheels, a main drive-shaft, a pair of friction-surfaces on and operated by said shaft, and a pair of driving-connections, one for a wheel at each side of the vehicle respectively, each of said driving-connections comprising a pair of adjustable friction-wheels engaging said friction-surfaces respectively.

4. In a motor-vehicle, the combination of a pair of rear and a pair of front wheels, a main-drive shaft, a pair of friction-surfaces on and operated by said shaft, and a pair of driving-connections, one for a wheel at each side of the vehicle respectively, each of said driving-connections comprising a pair of axially adjustable friction-wheels engaging said friction-surfaces respectively.

5. In a motor-vehicle, the combination of a pair of rear and a pair of front wheels, a main-drive shaft, a pair of friction-surfaces oppositely disposed on and operated by said shaft, and a pair of driving-connections, one for a wheel at each side of the vehicle respectively, each of said driving-connections comprising a pair of axially adjustable friction-wheels engaging said friction-surfaces respectively.

6. In a motor-vehicle, the combination of a pair of rear and a pair of front wheels, a main drive shaft, a pair of friction surfaces on and operated by said shaft, a pair of driving-connections, one for a wheel at each side of the vehicle respectively, each of said driving-connections comprising a pair of friction-wheels engaging said friction surfaces, respectively, and means for conjointly shifting both pairs of said friction wheels to bring them into or out of engagement with said friction surfaces.

7. In a motor-vehicle, the combination of a pair of rear and a pair of front wheels, a main drive-shaft, a pair of friction-surfaces oppositely disposed on and operated by said shaft, a pair of driving-connections one for a wheel at each side of the vehicle respectively, each of said driving-connections comprising a pair of friction-wheels engaging said friction-surfaces respectively, and means for conjointly shifting both pairs of said friction-wheels to bring them into or out of engagement with said friction-surfaces.

8. In a motor-vehicle, the combination of a pair of rear and a pair of front wheels, a main drive-shaft, a pair of friction-surfaces on and operated by said shaft, a pair of driving-connections one for a wheel at each side of the vehicle respectively, each of said driving-connections comprising a pair of friction-wheels engaging said friction-surfaces respectively, and means for conjointly shifting both of said pairs of friction-wheels radially to vary the speed of the driven wheels.

9. In a motor-vehicle, the combination of a pair of rear and a pair of front wheels, a main drive-shaft, a pair of friction-surfaces oppositely disposed on and operated by said shaft, a pair of driving-connections one for a wheel at each side of the vehicle respectively, each of said driving-connections comprising a pair of friction-wheels engaging said friction-surfaces respectively, and means for conjointly shifting both of said pairs of friction-wheels radially to vary the speed of the driven wheels.

10. In a motor-vehicle, the combination of a pair of rear and a pair of front wheels, a main drive-shaft, a pair of friction-surfaces on and operated by said shaft, a pair of driving-connections one for a wheel at each side of the vehicle respectively, each of said driving-connections comprising a pair of friction-wheels engaging said friction-surfaces respectively, means for conjointly shifting both of said pairs of friction-wheels into and out of engagement with said friction-surfaces, and means for conjointly shifting said friction-wheels radially to vary the speed of the wheels driven thereby.

11. In a motor-vehicle, the combination of a pair of rear and a pair of front wheels, a main drive shaft, a pair of friction surfaces oppositely disposed on and operated by said shaft, a pair of driving-connections, one for a wheel at each side of the vehicle respectively, each of said driving-connections comprising a pair of friction-wheels engaging said friction-surfaces respectively, means for conjointly shifting both of said pairs of friction-wheels into and out of engagement with said friction-surfaces, and means for conjointly shifting said friction-wheels radially to vary the speed of the wheels driven thereby.

12. In a motor-vehicle, the combination of a pair of rear and a pair of front wheels, a main drive-shaft, a pair of friction-surfaces on and operated by said shaft, a pair of driving-connections one for a wheel at each side of the vehicle respectively, each of said driving-connections comprising a pair of friction-wheels engaging said friction-surfaces respectively, and means for conjointly adjusting the friction-wheels radially to relatively vary the speed of the driving-connections.

13. In a motor-vehicle, the combination of a pair of rear and a pair of front wheels, a main drive-shaft, a pair of friction-surfaces oppositely disposed on and operated by said shaft, a pair of driving-connections one for a wheel at each side of the vehicle respectively, each of said driving-connections comprising a pair of friction-wheels engaging said friction-surfaces respectively, and means for conjointly adjusting both of said pairs of friction-wheels radially to relatively vary the speed of the driving-connections.

14. In a motor-vehicle, the combination of a pair of rear and a pair of front wheels, a main drive-shaft, a pair of friction-surfaces on and operated by said shaft, a pair of driving-connections one for a wheel at each side of the vehicle respectively, each of said driving-connections comprising a pair of friction-wheels engaging said friction-surfaces respectively, and means a shifting both of said pairs of friction wheels comprising means for conjointly shifting them radially to correspondingly vary the speed of both driving connections and to conjointly adjust both pairs of said friction-wheels radially to relatively vary the speed of the driving-connections.

15. In a motor-vehicle, the combination of a pair of rear and a pair of front wheels, a main drive-shaft, a pair of friction-surfaces oppositely disposed on and operated by said shaft, a pair of driving-connections one for a wheel at each side of the vehicle respectively, each of said driving-connections comprising a pair of friction-wheels engaging said friction-surfaces respectively, and means for shifting both of said pairs of friction-wheels, comprising means for conjointly shifting them radially to correspondingly vary the speed of both driving-connections and to conjointly adjust both pairs of said friction-wheels radially to relatively vary the speed of the driving-connections.

16. In a motor-vehicle, the combination of a pair of rear and a pair of front wheels, a main drive-shaft, a pair of friction-surfaces on and operated by said shaft, a pair of driving-connections one for a wheel at each side of the vehicle respectively, each of said driving-connections comprising a pair of friction-wheels engaging said friction-surfaces respectively, a steering-device, and means for conjointly adjusting both pairs of friction-wheels to relatively vary the speed of said driving-connections, said adjusting-means being operated by said steering-device.

17. In a motor-vehicle, the combination of a pair of rear and a pair of front wheels, a main drive-shaft, a pair of friction-surfaces oppositely disposed on and operated by said shaft, a pair of driving-connections, one for a wheel at each side of the vehicle respectively, each of said driving-connections comprising a pair of friction-wheels engaging said friction-surfaces respectively, a steering-device, and means for conjointly adjusting both pairs of friction-wheels to relatively vary the speed of said driving-connections, said adjusting-means being operated by said steering-device.

18. In a motor-vehicle, the combination of a pair of rear and a pair of front wheels, a main drive-shaft, a pair of friction-surfaces on and operated by said shaft, a pair of driving-connections one for a wheel at each side of the vehicle respectively, each of said driving-connections comprising a pair of friction-wheels engaging said friction surfaces respectively, a steering-device, means for conjointly adjusting both pairs of friction-wheels to relatively vary the speed of said driving connections, said adjusting-means being operated by said steering-device, and means for shifting both of said pairs of friction-wheels into and out of engagement with said friction surfaces.

19. In a motor-vehicle, the combination of a pair of rear and a pair of front wheels, a main drive-shaft, a pair of friction-surfaces oppositely disposed on and operated by said shaft, a pair of driving-connections, one for a wheel at each side of the vehicle respectively, each of said driving-connections comprising a pair of friction-wheels engaging said friction-surfaces respectively, a steering-device, means for conjointly adjusting both pairs of friction-wheels to relatively vary the speed of said driving-connections, said adjusting-means being operated by said steering-device, and means for shifting both pairs of said friction-wheels into and out of engagement with said friction-surfaces.

20. In a motor-vehicle, the combination of a pair of rear and a pair of front traction-wheels, a main-drive-shaft, a pair of friction surfaces on and operated by said shaft, and a pair of driving-connections, one for both wheels at one side of the vehicle and the other for the wheels at the other side, each of said driving-connections comprising a pair of friction-wheels engaging said friction-surfaces respectively.

21. In a motor-vehicle, the combination of a pair of rear and a pair of front traction-wheels, a main drive-shaft, a pair of friction-surfaces oppositely disposed on and operated by said shaft, a pair of driving-connections one for both wheels at one side of the vehicle and the other for the wheels at the other side, each of said driving-connections comprising a pair of friction-wheels engaging said friction-surfaces respectively, and means for conjointly shifting both pairs of said friction-wheels to bring them into or out of engagement with said friction-surfaces.

22. In a motor-vehicle, the combination of a pair of rear and a pair of front traction wheels, a main drive-shaft a pair of friction-surfaces on and operated by said shaft, a pair of driving-connections one for both wheels at one side of the vehicle and the other for the wheels at the other side, each of said driving-connections comprising a pair of friction-wheels engaging said friction-surfaces respectively, and means for conjointly shifting both of said pairs of friction-wheels radially to vary the speed of the driven wheels.

23. In a motor-vehicle, the combination of a pair of rear and a pair of front traction-wheels, a main drive-shaft, a pair of friction-surfaces oppositely disposed on and operated by said shaft, a pair of driving-connections one for both wheels at one side of the vehicle and the other for the wheels at the other side, each of said driving-connections comprising a pair of friction-wheels engaging said friction-surfaces respectively, and means for conjointly shifting both of said pairs of friction-wheels radially to vary the speed of the driven wheels.

24. In a motor-vehicle, the combination of a pair of rear and a pair of front traction-wheels, a main drive-shaft, a pair of friction-surfaces on and operated by said shaft, a pair of driving-connections one for both wheels at one side of the vehicle and the other for the wheels at the other side, each of said driving-connections comprising a pair of friction-wheels engaging said friction-surfaces respectively, means for conjointly shifting both of said pairs of friction-wheels into and out of engagement with said friction-surfaces, and means for conjointly shifting said friction-wheels radially to vary the speed of the wheels driven thereby.

25. In a motor-vehicle, the combination of a pair of rear and a pair of front traction-wheels, a main drive shaft, a pair of friction-surfaces oppositely disposed on and operated by said shaft, a pair of driving-connections one for both wheels at one side of the vehicle and the other for the wheels at the other side, each of said driving-connections comprising a pair of friction-wheels engaging said friction-surfaces respectively, means for conjointly shifting both of said pairs of friction-wheels into and out of engagement with said friction-surfaces, and means for conjointly shifting said friction-wheels radially to vary the speed of the wheels driven thereby.

26. In a motor-vehicle, the combination of a pair of rear and a pair of front traction-wheels, a main drive-shaft, a pair of friction-surfaces on and operated by said shaft, a pair of driving-connections one for both wheels at one side of the vehicle and the other for the wheels at the other side, each of said driving-connections comprising a pair of friction-wheels engaging said friction-surfaces respectively, and means for conjointly adjusting both pairs of friction-wheels radially to relatively vary the speed of the driving-connections.

27. In a motor-vehicle, the combination of a pair of rear and a pair of front traction-wheels, a main drive-shaft, a pair of friction-surfaces oppositely disposed on and operated by said shaft, a pair of driving-connections one for both wheels at one side of the vehicle and the other for the wheels at the other side, each of said driving-connections comprising a pair of friction-wheels engaging said friction-surfaces respectively, and means for conjointly adjusting both of said pairs of friction-wheels radially to relatively vary the speed of the driving-connections.

28. In a motor-vehicle, the combination of a pair of rear and a pair of front traction-wheels, a main drive-shaft, a pair of friction-surfaces on and operated by said shaft, a pair of driving-connections one for both wheels at one side of the vehicle and the other for the wheels at the other side, each of said driving-connections comprising a pair of friction-wheels engaging said friction-surfaces respectively, and means for shifting both of said pairs of friction-wheels comprising means for conjointly shifting them radially to correspondingly vary the speed of both driving-connections and to conjointly adjust both pairs of said friction-wheels radially to relatively vary the speed of the driving-connections.

29. In a motor-vehicle, the combination of a pair of rear and a pair of front traction-wheels, a main drive-shaft, a pair of friction-surfaces oppositely disposed on and operated by said shaft, a pair of driving-connections one for both wheels at one side of the vehicle and the other for the wheels at the other side, each of said driving-connections comprising a pair of friction-wheels engaging said friction-surfaces respectively, and means for shifting both of said pairs of friction-wheels comprising means for conjointly shifting them radially to correspondingly vary the speed of both driving-connections and to conjointly adjust both pairs of said friction-wheels radially to relatively vary the speed of the driving-connections.

30. In a motor-vehicle, the combination of a pair of rear and a pair of front traction-wheels, a main drive-shaft, a pair of friction-surfaces on and operated by said shaft, a pair of driving-connections one for both wheels at one side of the vehicle and the other for the wheels at the other side, each of said driving-connections comprising a pair of friction-wheels engaging said friction-surfaces respectively, a steering-device, and means for conjointly adjusting both pairs of friction-wheels to relatively vary the speed of said driving-connections, said adjusting-means being operated by said steering-device.

31. In a motor-vehicle, the combination of a pair of rear and a pair of front traction-wheels, a main drive-shaft, a pair of friction-surfaces oppositely disposed on and operated by said shaft, a pair of driving-connections one for both wheels at one side of the vehicle and the other for the wheels at the other side, each of said driving-connections comprising a pair of friction-wheels engaging said friction-surfaces respectively, a steering-device, and means for conjointly adjusting both pairs of friction-wheels to relatively vary the speed of said driving-connections, said adjusting-means being operated by said steering-device.

32. In a motor-vehicle, the combination of a pair of rear and a pair of front traction-wheels, a main drive-shaft, a pair of friction-surfaces on and operated by said shaft, a pair of driving-connections one for both wheels at one side of the vehicle and the other for the wheels at the other side, each of said driving-connections comprising a pair of friction-wheels engaging said friction-surfaces respectively, a steering-device, means for conjointly adjusting both pairs of friction-wheels to relatively vary the speed of said driving-connections, said adjusting-means being operated by said steering-device, and means for shifting both of said friction-wheels into and out of engagement with said friction-surfaces.

33. In a motor-vehicle, the combination of a pair of rear and a pair of front traction-wheels, a main drive-shaft, a pair of friction-surfaces oppositely disposed on and operated by said shaft, a pair of driving-connections one for both wheels at one side of the vehicle and the other for the wheels at the other side, each of said driving-connections comprising a pair of friction-wheels engaging said friction-surfaces respectively, a steering-device, means for conjointly adjusting both pairs of friction-wheels to relatively vary the speed of said driving-connections, said adjusting-means being operated by said steering-device, and means for shifting both of said friction-wheels into and out of engagement with said friction-surfaces.

34. In a motor-vehicle, the combination of a pair of rear and a pair of front traction-wheels, a main-drive shaft, a pair of friction-surfaces oppositely disposed on and operated by said shaft, and a pair of driving-connections one for both wheels at one side of the vehicle and the other for the wheels at the other side, each of said driving-connections comprising a pair of friction-wheels engaging said friction-surfaces respectively.

35. In a motor-vehicle, the combination of a pair of rear and a pair of front traction-wheels, a main drive-shaft, a pair of friction-surfaces on and operated by said shaft, and a pair of driving-connections one for both wheels at one side of the vehicle and the other for the wheels at the other side, each of said driving-connections comprising a pair of adjustable friction-wheels engaging said friction-surfaces respectively.

36. In a motor-vehicle, the combination of a pair of rear and a pair of front traction-wheels, a main drive-shaft a pair of friction-surfaces on and operated by said shaft, and a pair of driving-connections one for both wheels at one side of the vehicle and the other for the wheels at the other side, each of said driving-connections comprising a pair of axially adjustable friction-wheels engaging said friction-surfaces respectively.

37. In a motor-vehicle, the combination of a pair of rear and a pair of front traction-wheels, a main drive-shaft a pair of friction-surfaces oppositely disposed on and operated by said shaft, and a pair of driving-connections, one for both wheels at one side of the vehicle and the other for the wheels at the other side, each of said driving-connections comprising a pair of axially adjustable friction-wheels engaging said friction-surfaces respectively.

38. In a motor-vehicle, the combination of a pair of front and a pair of rear wheels, a main-drive shaft, a wheel having oppositely disposed friction-faces thereon, and a pair of driving-connections, one for a wheel at one side, and the other for a wheel at the other side of the vehicle, each of said connections comprising a pair of friction-wheels engaging said faces respectively and between which said faces are disposed.

39. In a motor-vehicle, the combination of a pair of rear and a pair of front wheels, a main drive-shaft, a wheel having oppositely disposed friction-faces thereon, a pair of driving-connections, one for a wheel at one side, and the other for a wheel at the other side of the vehicle, each of said connections comprising a pair of friction-wheels engaging said faces respectively and between which said faces are disposed, and means for conjointly shifting both of said pairs of friction-wheels into and out of engagement with said faces.

40. In a motor-vehicle, the combination of a pair of front and a pair of rear wheels, a main drive-shaft, a wheel having oppositely disposed friction-faces thereon, a pair of driving-connections, one for a wheel at one side, and the other for a wheel at the other side of the vehicle, each of said connections comprising a pair of friction-wheels engaging said faces respectively and between which said faces are disposed, and means for shifting both of said pairs of friction-wheels radially to vary the speed of the wheels driven thereby.

41. In a motor-vehicle, the combination of a pair of front and a pair of rear wheels, a main drive-shaft, a wheel having oppositely disposed friction-faces thereon, a pair of driving-connections, one for a wheel at one side, and the other for a wheel at the other side of the vehicle, each of said connections comprising a pair of friction-wheels engaging said faces respectively and between which said faces are disposed, means for conjointly shifting both of said pairs of friction-wheels into or out of engagement with said faces, and means for shifting both of said pairs of friction-wheels radially to vary the speed of the wheels driven thereby.

42. In a motor-vehicle, the combination of a pair of front and a pair of rear wheels, a main drive-shaft, a wheel having oppositely disposed friction-faces thereon, a pair of driving-connections, one for a wheel at one side, and the other for a wheel at the other side of the vehicle, each of said connections comprising a pair of friction-wheels engaging said faces respectively and between which said faces are disposed and means for conjointly adjusting both of said pairs of friction-wheels radially to relatively vary the speed of the driving-connections.

43. In a motor-vehicle, the combination of a pair of front and a pair of rear wheels, a main drive-shaft, a wheel having oppositely disposed friction-faces thereon, a pair of driving-connections one for a wheel at one side and the other for a wheel at the other side of the vehicle, each of said connections comprising a pair of friction-wheels engaging said faces respectively and between which said faces are disposed, means for conjointly shifting both of said pairs of friction-wheels into or out of engagement with said faces, and for conjointly adjusting both of said pairs of friction-wheels radially to relatively vary the speed of the driving-connections.

44. In a motor-vehicle, the combination of a pair of front and a pair of rear wheels, a main drive-shaft, a wheel having oppositely disposed friction-faces thereon, a pair of driving-connections one for a wheel at one side and the other for a wheel at the other side of the vehicle, each of said connections comprising a pair of friction-wheels engaging said faces respectively and between which said faces are disposed, and means for shifting both of said pairs of friction-wheels radially to vary the speed of the wheels driven thereby and for conjointly adjusting both of said pairs of friction-wheels radially to relatively vary the speed of the driving connections.

45. In a motor-vehicle, the combination of a pair of front and a pair of rear wheels, a main drive-shaft, a wheel having oppositely disposed friction-faces thereon, a pair of driving-connections one for a wheel at one side, and the other for a wheel at the other side of the vehicle, each of said connections comprising a pair of friction-wheels engaging said faces respectively and between which said faces are disposed, and means for shifting both of said pairs of friction-wheels radially to vary the speed of the wheels driven thereby and for conjointly adjusting both of said pairs of friction-wheels radially to relatively vary the speed of the driving-connections.

46. In a motor-vehicle, the combination of a pair of front and a pair of rear wheels, a main drive-shaft, a wheel having oppositely disposed friction-faces thereon, a pair of driving-connections, one for a wheel at one side and the other for a wheel at the other side of the vehicle, each of said connections comprising a pair of friction-wheels engaging said faces respectively and between which said faces are disposed, a steering-device, and means for conjointly adjusting both pairs of friction-wheels to relatively vary the speed of said driving-connections, said adjusting-means being operated by the steering-device.

47. In a motor-vehicle, the combination of a pair of front and a pair of rear wheels, a main drive-shaft, a wheel having oppositely disposed friction-faces thereon, a pair of driving-connections, one for a wheel at one side and the other for a wheel at the other side of the vehicle, each of said connections comprising a pair of friction-wheels engaging said faces respectively and between which said faces are disposed, a steering-device, means for conjointly adjusting both pairs of friction-wheels to relatively vary the speed of said driving-connections, said adjusting-means being operated by the steering-device, and means for shifting both pairs of said friction-wheels into or out of engagement with said friction-faces respectively.

48. In a motor-vehicle, the combination of a pair of front and a pair of rear wheels, a main drive-shaft, a wheel having oppositely disposed friction-faces thereon, a pair of driving-connections, one for a wheel at one side and the other for a wheel at the other side of the vehicle, each of said connections comprising a pair of friction-wheels engaging said faces respectively and between which said faces are disposed, a steering-device, means for conjointly adjusting both pairs of friction-wheels to relatively vary the speed of said driving-connections, said adjusting-means being operated by the steering-device, means for shifting both pairs of said friction-wheels into or out of engagement with said friction-faces respectively, and means for conjointly adjusting said friction-wheels to correspondingly vary the speed of both of said driving-connections.

49. In a motor-vehicle, the combination of a pair of front and a pair of rear wheels, a main drive-shaft, a wheel having oppositely disposed friction-faces thereon, a pair of driving-connections, one for a wheel at one side, and the other for a wheel at the other side of the vehicle, each of said connections comprising a pair of friction-wheels engaging said faces respectively and between which said faces are disposed, and a pair of friction-disks on the main drive-shaft with which said friction-wheels are adapted to engage to drive the connections in reverse direction.

50. In a motor-vehicle, the combination of a pair of front and a pair of rear wheels, a main drive-shaft, a wheel having oppositely disposed friction-faces thereon, a pair of driving-connections, one for a wheel at one side and the other for a wheel at the other side of the vehicle, each of said connections comprising a pair of friction-wheels engaging said faces respectively and between which said faces are disposed, a pair of friction-disks on the main drive-shaft and with which said friction-wheels are adapted to engage to drive the connections in reverse direction, and means for conjointly shifting said friction-wheels into or out of engagement with said friction-faces or said disk respectively.

51. In a motor-vehicle, the combination of a pair of front and a pair of rear wheels, a main drive-shaft, a wheel having oppositely disposed friction-faces thereon, a pair of driving-connections one for a wheel at one side and the other for a wheel at the other side of the vehicle, each of said connections comprising a pair of friction-wheels engaging said faces respectively and between which said faces are disposed, a pair of friction-disks on the main drive-shaft with which said friction-wheels are adapted to engage to drive the connections in reverse direction, means for conjointly shifting said friction-wheels into or out of engagement with said friction-faces or said disks respectively, and means for conjointly adjusting said friction-wheels to correspondingly vary the speed of the driving-connections.

52. In a motor-vehicle, the combination of a pair of front and a pair of rear wheels, a main drive-shaft, a wheel having oppositely disposed friction-faces thereon, a pair of driving-connections one for a wheel at one side and the other for a wheel at the other side of the vehicle, each of said connections comprising a pair of friction-wheels engaging said faces respectively and between which said faces are disposed, a pair of friction-disks on the main drive-shaft with which said friction-wheels are adapted to engage to drive the connections in reverse direction, means for conjointly shifting said friction-wheels into or out of engagement with said friction-faces or said disks respectively, and means for adjusting the friction-wheels to relatively vary the speed of the driving-connections.

53. In a motor-vehicle, the combination of a pair of front and a pair of rear wheels, a main drive-shaft, a wheel having oppositely disposed friction-faces thereon, a pair of driving-connections one for a wheel at one side and the other for a wheel at the other side of the vehicle, each of said connections comprising a pair of friction-wheels engaging said faces respectively and between which said faces are disposed, a pair of friction-disks on the main drive-shaft with which said friction-wheels are adapted to engage to drive the connections in reverse direction, means for conjointly shifting said friction-wheels into or out of engagement with said friction-faces or said disks respectively, means for conjointly adjusting said friction-wheels to correspondingly vary the speed of the driving-connections and means for adjusting the friction-wheels to relatively vary the speed of the driving-connections.

54. In a motor-vehicle, the combination of a pair of front and a pair of rear wheels, a main drive-shaft, a wheel having oppositely disposed friction-faces thereon, and a pair of driving-connections, one for both wheels at one side and the other for both wheels at the other side of the vehicle, each of said connections comprising a pair of friction-wheels engaging said faces respectively and between which said faces are disposed.

55. In a motor-vehicle, the combination of a pair of rear and a pair of front wheels, a main drive-shaft, a wheel having oppositely disposed friction-faces thereon, a pair of driving-connections, one for both wheels at one side, and the other for both wheels at the other side of the vehicle, each of said connections comprising a pair of friction-wheels engaging said faces respectively and between which said faces are disposed, and means for conjointly shifting both of said pairs of friction-wheels into and out of engagement with said faces.

56. In a motor-vehicle, the combination of a pair of front and a pair of rear wheels, a main drive-shaft, a wheel having oppositely disposed friction-faces thereon, a pair of driving-connections, one for both wheels at one side and the other for both wheels at the other side of the vehicle, each of said connections comprising a pair of friction-wheels engaging said faces respectively and between which said faces are disposed, and means for shifting both of said pairs of friction-wheels radially to vary the speed of the wheels driven thereby.

57. In a motor-vehicle, the combination of a pair of front and a pair of rear wheels, a main drive-shaft, a wheel having oppositely disposed friction-faces thereon, a pair of driving-connections one for both wheels at one side and the other for both wheels at the other side of the vehicle, each of said connections comprising a pair of friction-wheels engaging said faces respectively and between which said faces are disposed, means for conjointly shifting both of said pairs of friction-wheels into or out of engagement with said faces, and means for shifting both of said pairs of friction-wheels radially to vary the speed of the wheels driven thereby.

58. In a motor-vehicle, the combination of a pair of front and a pair of rear traction-wheels, each of which is dirigibly connected to the vehicle, a main drive-shaft, driving-connections for all of said traction-wheels comprising friction-faces and friction-wheels engaging said faces, means for adjusting said friction-wheels to drive the traction-wheels at one side at different relative speed with respect to the traction-wheels at the other, and means for shifting the friction-wheels into or out of engagement with said faces.

59. In a motor-vehicle, the combination of a pair of front and a pair of rear traction-wheels, each of which is dirigibly connected to the vehicle, a main drive-shaft, driving-connections for all of said traction-wheels comprising friction-faces and friction-wheels engaging said faces, means for adjusting said friction-wheels to drive the traction-wheels at one side at different relative speed with respect to the traction-wheels at the other, a steering-device connected to the traction-wheels and connected to operate said adjusting-means, and means for shifting the friction-wheels into or out of engagement with said faces.

60. In a motor-vehicle, the combination of a pair of front and a pair of rear traction-wheels, each of which is dirigibly connected to the vehicle, a main drive-shaft, driving-connections for all of said traction-wheels comprising friction-faces and friction-wheels engaging said faces, means for adjusting said friction-wheels to drive the traction-wheels at one side at different relative speed with respect to the traction-wheels at the other, a steering-device connected to the traction-wheels and connected to operate said adjusting-means, and means operated by said device for turning all of the wheels in the same direction.

61. In a motor-vehicle, the combination of a pair of front and a pair of rear traction-wheels, each of which is dirigibly connected to the vehicle, a main drive-shaft, driving-connections for all of said traction-wheels comprising friction faces and friction wheels engaging said faces, means for adjusting said friction-wheels to drive the traction-wheels at one side at different relative speed with respect to the traction-wheels at the other, a steering device connected to the traction-wheels and connected to operate said adjusting-means and means for rendering said adjusting-means inoperative by the steering-device.

62. In a motor-vehicle, the combination of a pair of front and a pair of rear traction-wheels, each of which is dirigibly connected to the vehicle, a main drive-shaft, driving-connections for all of said traction-wheels comprising friction-faces and friction-wheels engaging said faces, means for adjusting said friction-wheels to drive the traction-wheels at one side at different relative speed with respect to the traction-wheels at the other, a steering-device connected to the traction-wheels and connected to operate said adjusting-means, means for turning all of said traction-wheels in the same direction, and means for rendering the adjusting-means inoperative by the steering-device.

63. In a motor-vehicle, the combination of a pair of front and a pair of rear wheels, a main drive-shaft, a friction drive mechanism operated by said shaft and comprising friction-wheels, a driving connection operated by each of said friction-wheels, means for adjusting said friction-wheels radially to correspondingly vary the speed of said connections and means for relatively adjusting them to relatively vary the speed of the connections.

64. In a motor-vehicle, the combination of a pair of front and a pair of rear wheels, a main drive-shaft, a friction drive mechanism operated by said shaft and comprising friction-wheels, a driving-connection operated by each of said friction-wheels, means for adjusting said friction-wheels radially to correspondingly vary the speed of said connections, means for relatively adjusting them to relatively vary the speed of the connections, and a steering-device to which said relatively adjusting-means is connected.

65. In a motor-vehicle, the combination of a pair of front and a pair of rear wheels, a main drive-shaft, a friction drive mechanism operated by said shaft and comprising friction-wheels, a driving-connection operated by each of said friction-wheels, means for adjusting said friction-wheels radially to correspondingly vary the speed of said connections, means for relatively adjusting them to relatively vary the speed of the connections, and means for conjointly shifting all of the friction-wheels into and out of operative position.

66. In a motor-vehicle, the combination of a pair of front and a pair of rear wheels, a main drive-shaft, a friction drive-mechanism operated by said shaft and comprising friction-wheels, a driving-connection operated by each of said friction-wheels, means for adjusting said friction-wheels radially to correspondingly vary the speed of said connections, means for relatively adjusting them to relatively vary the speed of the connections, means for conjointly shifting all of the friction-wheels into and out of operative position, and a steering-device to which said relative adjusting-means is connected.

67. In a motor-vehicle, the combination of a pair of front and a pair of rear wheels, a main drive-shaft, a friction drive mechanism operated by said shaft and comprising friction-wheels, a driving-connection operated by each of said friction-wheels, means for adjusting said friction-wheels radially to correspondingly vary the speed of said connections, means for relatively adjusting them to relatively vary the speed of the connections, and a steering-device to which said relatively adjusting-means is connected, and means for rendering said latter adjusting-means inoperative by the steering-device.

68. In a motor-vehicle, the combination of a pair of front and a pair of rear wheels, a main drive-shaft, a friction drive mechanism operated by said shaft and comprising friction-wheels, a driving-connection operated by each of said friction-wheels, means for adjusting said friction-wheels radially to correspondingly vary the speed of said connections, means for relatively adjusting them to relatively vary the speed of the connections, a steering-device to which said relatively adjusting-means is connected, means for rendering said latter adjusting-means inoperative by the steering-device, and means for conjointly adjusting all of said friction-wheels into and out of operative position.

69. In a motor-vehicle, the combination of a pair of front and a pair of rear wheels, a main drive-shaft, a friction drive-mechanism operated by said shaft and comprising friction-wheels, a driving-connection operated by each of said friction-wheels, means for adjusting said friction-wheels radially to correspondingly vary the speed of said connections, and means for relatively adjusting them to relatively vary the speed of the connections, said driving-mechanism comprising means for driving said friction-wheels in either direction.

70. In a motor-vehicle, the combination of a pair of front and a pair of rear wheels, a main drive-shaft, a friction drive-mechanism operated by said shaft and comprising friction-wheels, a driving-connection operated by each of said friction-wheels, means for adjusting said friction-wheels radially to correspondingly vary the speed of said connections, means for relatively adjusting them to relatively vary the speed of the connections, said driving-mechanism comprising means for driving said friction-wheels in either direction, and means for conjointly adjusting the friction-wheels into either of their operative positions.

STEPHEN B. GRAY.

Witnesses:
 FRED GERLACH,
 LEONE S. RUSSELL.